US012664210B2

(12) United States Patent　　　　(10) Patent No.: US 12,664,210 B2
Bruballa et al.　　　　　　　　　　　(45) Date of Patent: *Jun. 23, 2026

(54) MEDIA FILE RECOMMENDATIONS FOR A SEARCH ENGINE

(71) Applicant: Shutterstock, Inc., New York, NY (US)

(72) Inventors: Raúl Gómez Bruballa, Dublin (IE);
Alessandra Sala, Dublin (IE)

(73) Assignee: Shutterstock, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/012,588

(22) Filed: Jan. 7, 2025

(65) Prior Publication Data

US 2025/0139155 A1　　May 1, 2025

Related U.S. Application Data

(63) Continuation of application No. 18/151,288, filed on Jan. 6, 2023, now Pat. No. 12,210,565.
(Continued)

(51) Int. Cl.
*G06F 16/24*　　　(2019.01)
*G06F 16/245*　　(2019.01)
*G06F 16/535*　　(2019.01)
*G06F 16/583*　　(2019.01)
*G06F 16/587*　　(2019.01)

(52) U.S. Cl.
CPC .......... *G06F 16/535* (2019.01); *G06F 16/583* (2019.01); *G06F 16/587* (2019.01)

(58) Field of Classification Search
None
See application file for complete search history.

(56) References Cited

U.S. PATENT DOCUMENTS 7,765,227 B1 * 7/2010 Khoshnevisan .... G06F 16/9535
　　　　　　　　　　　　　　　　　707/769
8,078,617 B1 * 12/2011 Neveitt ................. G06F 16/335
　　　　　　　　　　　　　　　　　707/732

(Continued)

OTHER PUBLICATIONS

EPO—International Search Report and Written Opinion Report for related International Application No. PCT/US2023/033083 mailed Nov. 23, 2023, 9 pgs.

*Primary Examiner* — Son T Hoang

(74) *Attorney, Agent, or Firm* — McDermott Will & Schulte LLP

(57) ABSTRACT

An embodiment includes determining a style preference score for a new media file based on a recommendation model, wherein the new media file is selected by a user; and when the style preference score is lower than a pre-selected value: identifying a new attribute in the new media file that is not included in the model, updating a first coefficient in the recommendation model based on a value of the new attribute, scoring multiple media files in a user-related search history of the user with the model to form a ranked list based on the updated first coefficient, and updating a second coefficient in the recommendation model when the new media file is not at a top position of the ranked list, relative to the multiple media files in the user-related search history, and storing the updated recommendation model in a training database.

20 Claims, 17 Drawing Sheets

702 — Receive, in a search engine, a search query for a media file from a user

704 — Identify a style preference of the user associated with one or more media file attributes, based on a user-related search history 706 — Select, from a database, a one or more media files based on the search query and the style preference of the user 708 — Determine a style preference score for the one or more media files, based on the media file attributes 710 — Recommend to the user a top ranked media file based on the style preference score

Related U.S. Application Data

(60)  Provisional application No. 63/407,911, filed on Sep. 19, 2022.

(56)  References Cited

U.S. PATENT DOCUMENTS

| | | | | |
|---|---|---|---|---|
| 10,963,939 | B1 | 3/2021 | Zehr et al. | |
| 11,048,744 | B1 | 6/2021 | Hohwald et al. | |
| 2008/0195456 | A1* | 8/2008 | Fitzpatrick | G06F 16/9535 |
| 2008/0270355 | A1* | 10/2008 | Patel | G06F 16/9535 |
| 2015/0161258 | A1* | 6/2015 | Yee | G06F 16/24578 |
| | | | | 707/706 |
| 2016/0364783 | A1* | 12/2016 | Ramanuja | G06F 16/9535 |
| 2018/0329990 | A1* | 11/2018 | Severn | G06F 16/335 |
| 2018/0329996 | A1 | 11/2018 | Perkins et al. | |
| 2020/0225817 | A1 | 7/2020 | Coffman | |
| 2022/0058504 | A1* | 2/2022 | Malhotra | G06F 16/95 |
| 2025/0200665 | A1* | 6/2025 | Willis | G06F 16/90 |

\* cited by examiner

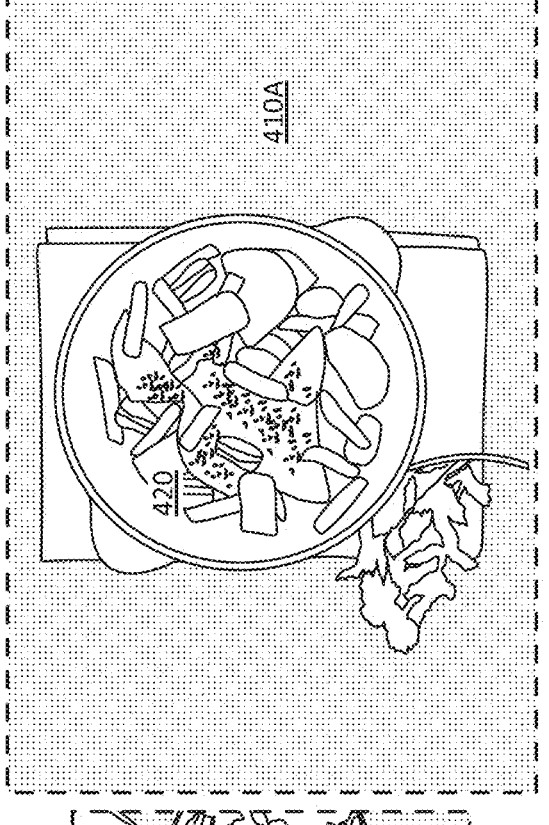
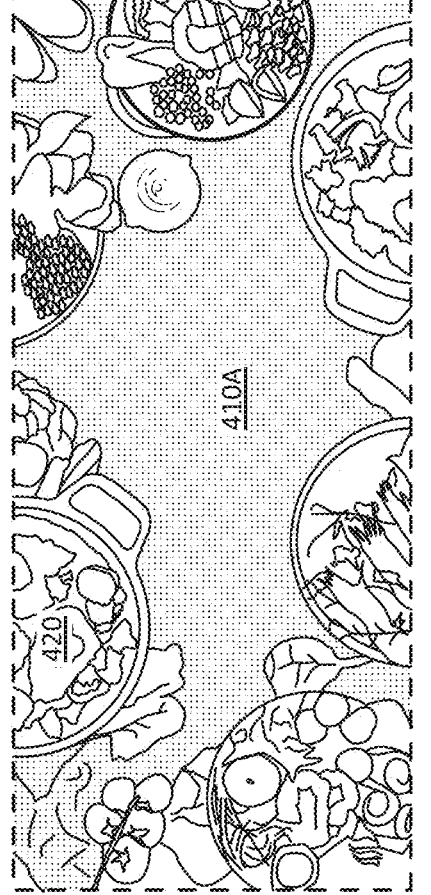
FIG. 4A

400G 460-1

460-2

460-3

625B

625C

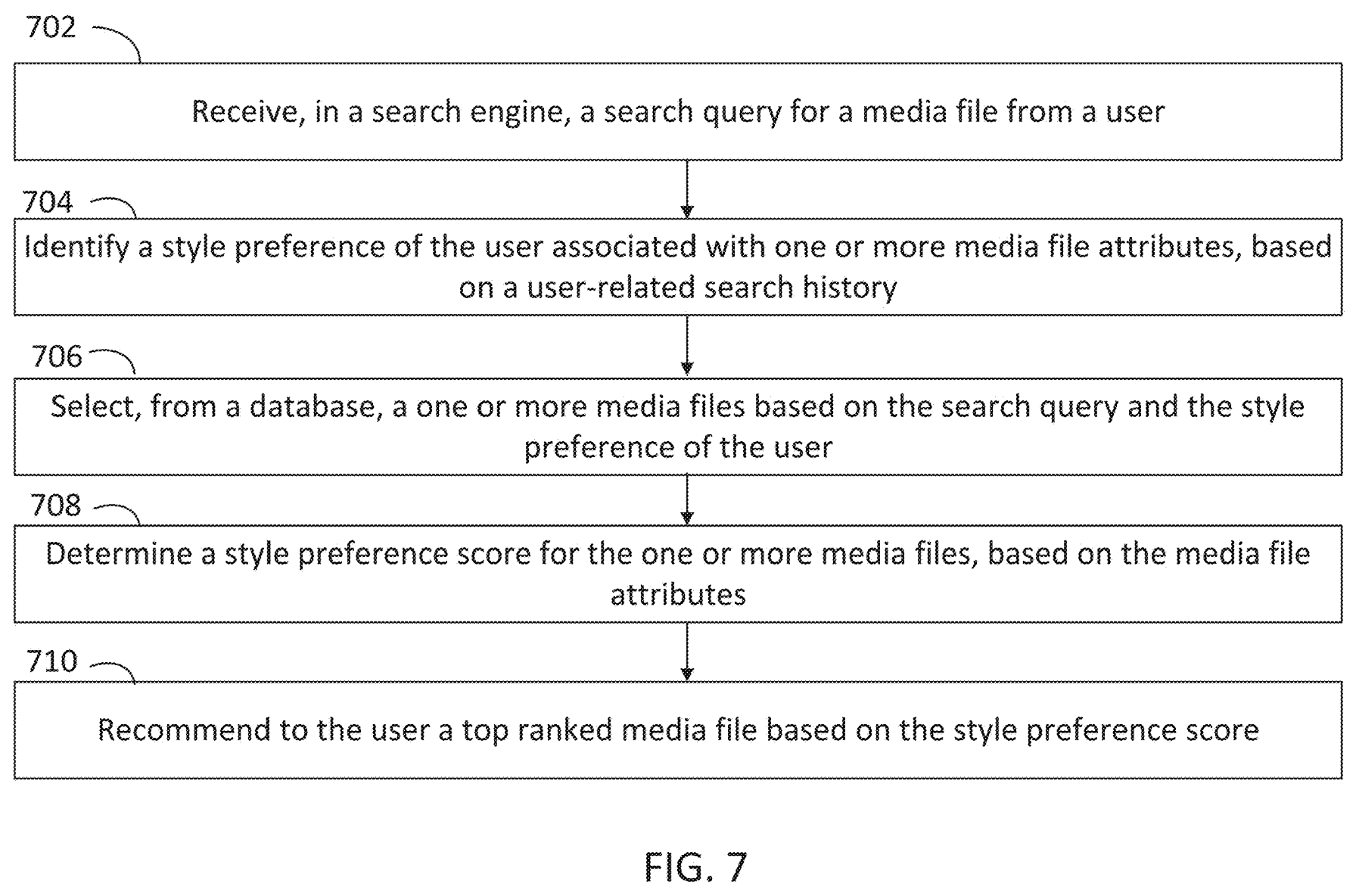

702 Receive, in a search engine, a search query for a media file from a user

704 Identify a style preference of the user associated with one or more media file attributes, based on a user-related search history 706 Select, from a database, a one or more media files based on the search query and the style preference of the user 708 Determine a style preference score for the one or more media files, based on the media file attributes 710 Recommend to the user a top ranked media file based on the style preference score

FIG. 7

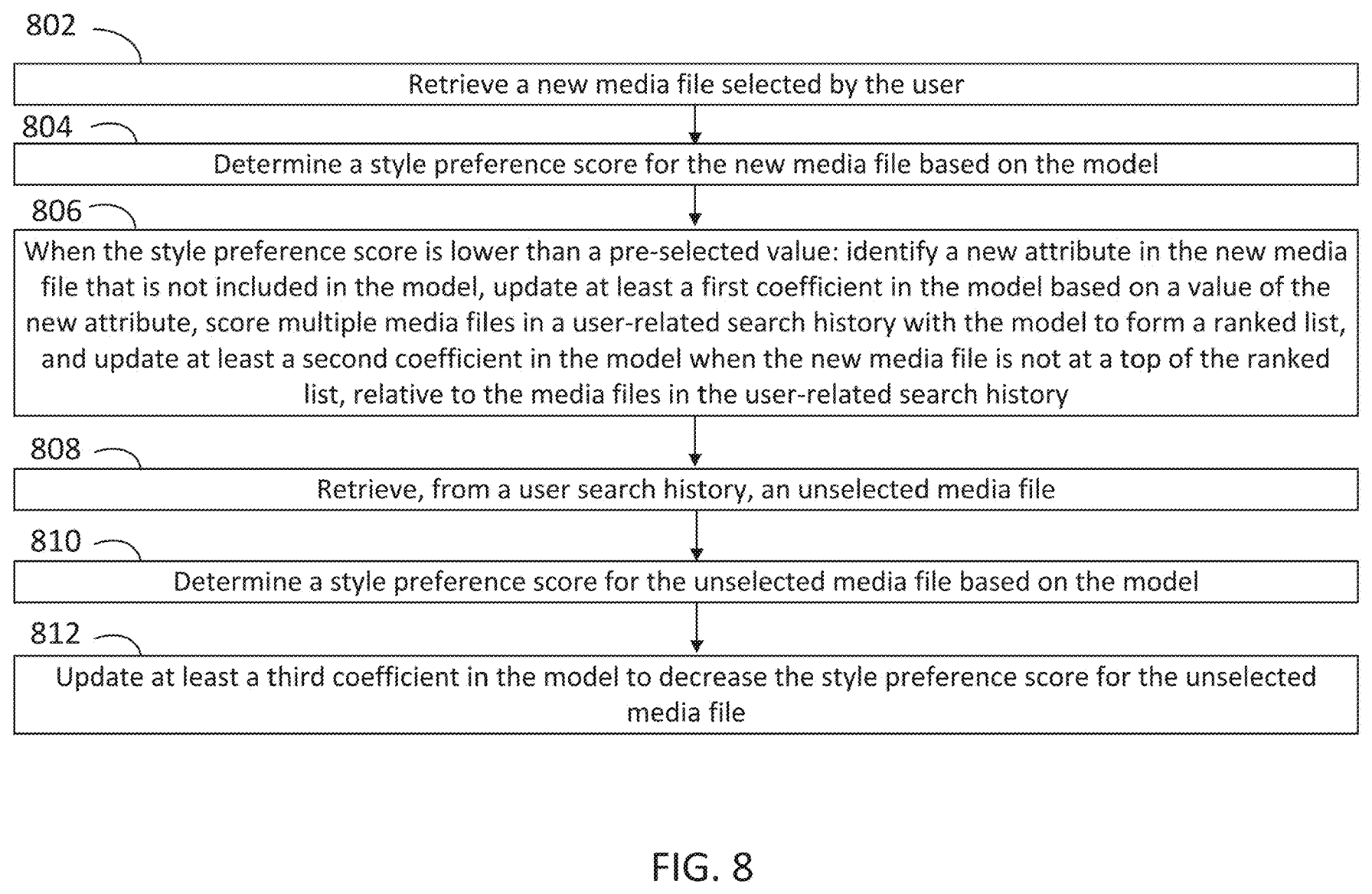

802 — Retrieve a new media file selected by the user

804 — Determine a style preference score for the new media file based on the model 806 — When the style preference score is lower than a pre-selected value: identify a new attribute in the new media file that is not included in the model, update at least a first coefficient in the model based on a value of the new attribute, score multiple media files in a user-related search history with the model to form a ranked list, and update at least a second coefficient in the model when the new media file is not at a top of the ranked list, relative to the media files in the user-related search history 808 — Retrieve, from a user search history, an unselected media file 810 — Determine a style preference score for the unselected media file based on the model 812 — Update at least a third coefficient in the model to decrease the style preference score for the unselected media file

FIG. 8

MEDIA FILE RECOMMENDATIONS FOR A SEARCH ENGINE

CROSS-REFERENCE TO RELATED APPLICATIONS

The present disclosure is related and claims priority under 35 U.S.C. § 120 as a continuation of U.S. patent application Ser. No. 18/151,288, filed Jan. 6, 2023, entitled MEDIA FILE RECOMMENDATIONS FOR A SEARCH ENGINE, to Raul GOMEZ et al., which claims benefit of priority under 35 U.S.C. § 119 (e) to U.S. Prov. Appln. No. 63/407,911, entitled SYSTEM FOR RANKING MEDIA FILES ACCORDING TO STYLE, to Raul GOMEZ et al., filed on Sep. 19, 2022, the contents of which are hereinafter incorporated by reference in their entirety, for all purposes.

BACKGROUND

Field

The present disclosure generally relates to editing applications for creative multimedia projects. More specifically, the present disclosure relates to editing applications that enable a project manager to allocate tasks to multiple designers to complete a graphic, design, or multimedia project, upon request by a project master.

Description of the Related Art

Graphic designers, even though they may be working in disparate projects, typically have a personalized style that is reflected across a body of work. However, platforms that service these professionals typically lack the ability to identify these deep style traits that define different people, industries, and even geographic origin thereof. The result is that people using state-of-the art design platforms have to spend inordinate amounts of time searching for the right images or media files that serve their design purpose with their personalized style.

SUMMARY

In an embodiment, a method includes: determining a style preference score for a new media file based on a recommendation model, when the style preference score is lower than a pre-selected value, wherein the new media file is selected by a user: identifying a new attribute in the new media file that is not included in the recommendation model, updating at least a first coefficient in the recommendation model based on a value of the new attribute, scoring multiple media files in a user-related search history with the recommendation model to form a ranked list, and updating at least a second coefficient in the recommendation model when the new media file is not at a top of the ranked list, relative to the media files in the user-related search history.

In yet other embodiments, a system includes a first means to store instructions and a second means to execute the instructions and cause the system to perform a method described herein.

It is understood that other configurations of the subject technology will become readily apparent to those skilled in the art from the following detailed description.

BRIEF DESCRIPTION OF THE DRAWINGS

FIGS. 4A-4G illustrate images having attributes defining a style preference in a specific industry, according to some embodiments.

FIG. 7 is a flow chart illustrating steps in a method for providing media file recommendations based on a style preference by a user, according to some embodiments.

FIG. 8 is a flow chart illustrating steps in a method for training a style ranking model for use in a search engine, according to some embodiments.

In the figures, elements and steps denoted by the same or similar reference numerals are associated with the same or similar elements and steps, unless indicated otherwise.

DETAILED DESCRIPTION

Figure 1:
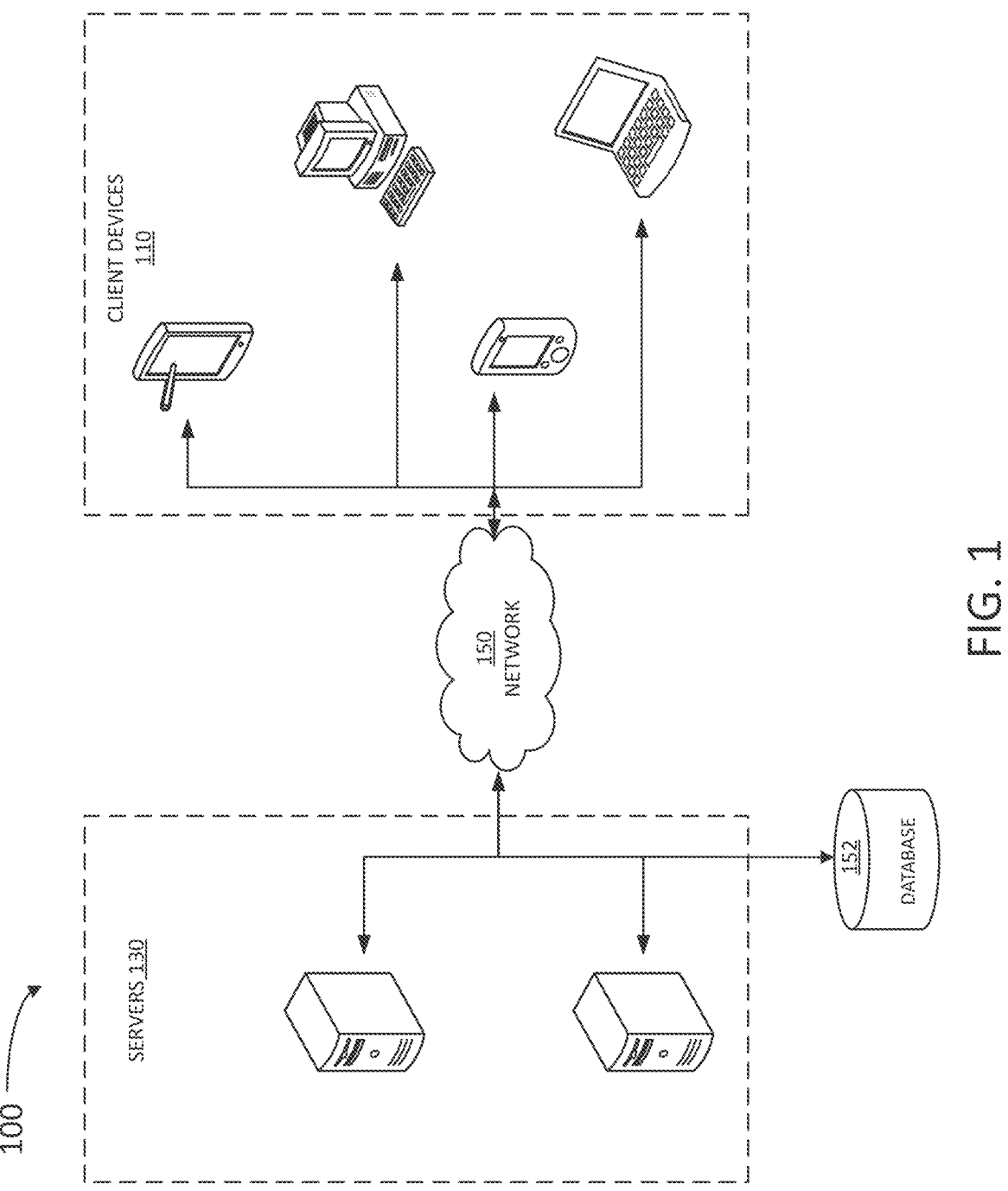
FIG. 1 illustrates an example architecture suitable for a crowdsourcing creative agency, according to some embodiments.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

As used herein, the term "media file" may be used, for example, in reference to a digital file that is composed of one or more media elements of different types (text, image, video, audio, and the like). A media file can be a single picture, a single video file, an audio file, or any combination of the above.

Users have visual style preferences which are stable across projects. In some situations, users themselves may be hard pressed to articulate in words or with a precise definition what their personal style is. In yet other circumstances, the personal style of a user may change in time, as the user gains more experience or goes through different life stages, or changes lifestyle, place of residence, and the like.

Embodiments herein aim to learn those to provide recommendations based on each individual user style preferences. High-level style preferences that do not depend on specific projects or subjects may be determined by a country or geographic region of a subject. For example, European subjects may tend to prefer casual images, whereas someone from the US may prefer heavily edited and produced (e.g., "stocky") images. Another classifier of high-level style preferences may include the industry associated with a user (e.g., food, automobile, law, travel and tourism, blogs, and the like). The individual style preferences of the users in this disclosure are long term preferences. e.g., preferences towards attributes which are stable over time, and over multiple creatives projects, in contrast to prior art approaches that use the most recent selection from users to try and predict future user selections.

Visual styles may be identified from attributes in the image file and also some metadata (e.g., country of origin, language, and some textual caption). Some of these attributes may include the dominant colors of the image, as determined with a color histogram. For instance, in the travel or tourism industry, blue, green, and white tonalities may be preferred. In the food industry, orange or red tonalities combined with green tonalities may be more common. Other attributes may be less concrete, such as an image texture, opacity, brilliance, or sharpness (e.g., in the food, clothing, or sports industry). Other image attributes may include angle of view, object distance (e.g., closeups, panoramic views), background (clear, dark, sharp, blurry, and the like), and style features which are based on keywords selected by the content curation team.

For audio and video media files, a personalized style may be defined by the instruments used in a musical piece, a music genre, a cadence, a rhythm, a dynamic range, and in a video: static or low pace, jittery images and fast pace, long single shot sequences, and the like.

Example System Architecture

FIG. 1 illustrates an example architecture 100 suitable for a creative agency, according to some embodiments. Architecture 100 includes servers 130 communicatively coupled with client devices 110 over a network 150. One of the many servers 130 is configured to host a memory including instructions which, when executed by a processor, cause the server 130 to perform at least some of the steps in methods as disclosed herein. In some embodiments, the processor is configured to manage a creative project upon request by the user of one of client devices 110. The creative project may include a multimedia advertising campaign, a movie or movie clip, a website launch, a musical composition, artistic development, or any other graphic design project. Accordingly, the processor may include a search engine with a classification tool, configured to classify documents in a database 152. For purposes of load balancing, multiple servers 130 can host memories including instructions to one or more processors, and multiple servers 130 can host a history log and the second image database. Moreover, the creative project may be a collaborative project involving multiple users working for a design agency, having client devices 110 accessing one or more servers 130 where one or more project documents are stored. Client devices 110 may communicate with each other via network 150 and through access to server 130 and resources located therein.

Servers 130 may include any device having an appropriate processor, memory, and communications capability for hosting the search engine including multiple tools associated with it. The search engine may be accessible by various clients 110 over network 150. Clients 110 can be, for example, desktop computers, mobile computers, tablet computers (e.g., including e-book readers), mobile devices (e.g., a smartphone or PDA), or any other devices having appropriate processor, memory, and communications capabilities for accessing the search engine on one or more of servers 130. Network 150 can include, for example, any one or more of a local area network (LAN), a wide area network (WAN), the Internet, and the like. Further, network 150 can include, but is not limited to, any one or more of the following tool topologies, including a bus network, a star network, a ring network, a mesh network, a star-bus network, tree or hierarchical network, and the like.

Figure 2:
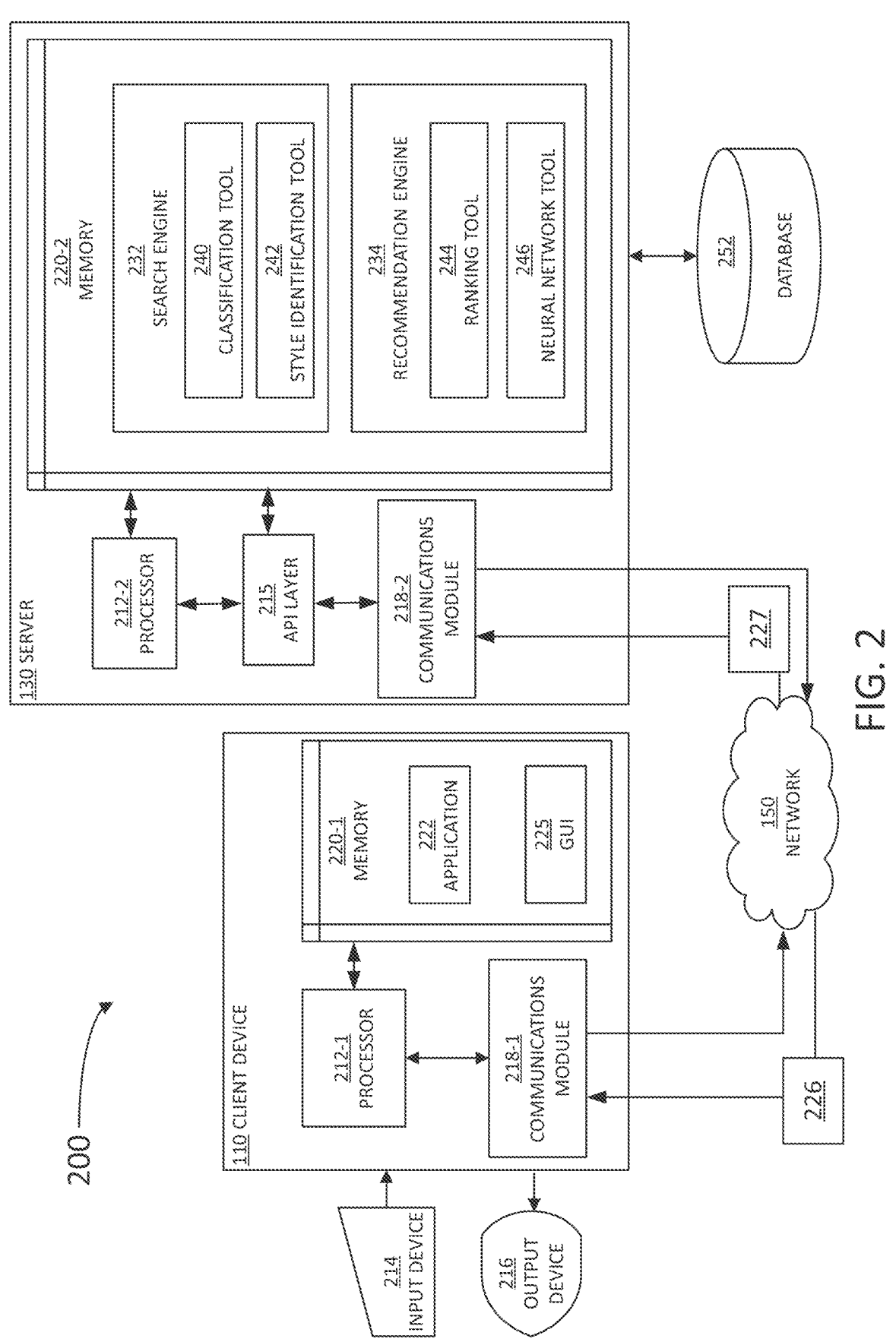
FIG. 2 is a block diagram illustrating an example server and client from the architecture of FIG. 1, according to certain aspects of the disclosure.

FIG. 2 is a block diagram 200 illustrating an example server 130 and client device 110 from the architecture of FIG. 1, according to certain aspects of the disclosure. Client device 110 and server 130 are communicatively coupled over network 150 via respective communications modules 218-1 and 218-2 (hereinafter, collectively referred to as "communications modules 218"). Communications modules 218 are configured to interface with network 150 to send and receive information, such as data, requests, responses, and commands to other devices on the network. Communications modules 218 can be, for example, modems or Ethernet cards. A user may interact with client device 110 via an input device 214 and an output device 216. Input device 214 may include a mouse, a keyboard, a pointer, a touchscreen, a microphone, and the like. Output device 216 may be a screen display, a touchscreen, a speaker, and the like. Client device 110 may include a memory 220-1 and a processor 212-1. Memory 220-1 may include an application 222, configured to run in client device 110. Application 222 may be downloaded by the user from server 130, and may be hosted by server 130. Server 130 may transmit a dataset 226 to client device 110, wherein dataset 226 may include a recommended media file for including in a graphic design in application 222, handled via a graphic user interface (GUI) 225. Similarly, client device 110 may provide a dataset 227 to server 130, wherein dataset 227 may include a search query, or a media file for uploading to database 252.

Server 130 includes a memory 220-2, a processor 212-2, a communications module 218-2, and an application programming interface (API) layer 215. Hereinafter, processors 212-1 and 212-2, and memories 220-1 and 220-2 will be collectively referred to, respectively, as "processors 212" and "memories 220." Processors 212 are configured to execute instructions stored in memories 220. In some embodiments, memory 220-2 includes a search engine 232 and a recommendation engine 234. Search engine 232 and recommendation engine 234 may share or provide features and resources to application 222, including multiple tools associated with a creative project, via API layer 215. The user may access search engine 232 and recommendation engine 234 through application 222 or a web browser installed in a memory 220-1 of client device 110. Accordingly, application 222 may be installed by server 130 and perform scripts and other routines provided by server 130 through any one of multiple tools. Execution of application 222 may be controlled by processor 212-1.

In that regard, search engine 232 may include a classification tool 240 and a style identification tool 242. Classification tool 240 may include classifiers to find captions or textual descriptions and keywords for media files (e.g., images, videos, or audio files) based on salient features in the media files. Classification tool 240 may assign a numeric value to the salient features, and thus locate the media file in a multi-dimensional space where the dimensions are defined by the classifiers. Style identification tool 242 may recognize a style of a media file by identifying a particular region of the multidimensional space that includes the vector associated with the media file. Style identification tool 242 may be configured to identify visual styles for images, or sound styles for music, or a combination thereof for videos.

Recommendation engine 234 may include a ranking tool 244 and a neural network tool 246. Ranking tool 244 may assign a score to a media file based on the location in the multidimensional space of the vector associated to the media file. The score may be associated to a style defined by style identification tool 242. For example, when style identification tool 242 defines a volume in the multi-dimensional space, then ranking tool 244 may assign a score to the media file based on the distance from the vector to the boundaries of the volume in the multidimensional space. Accordingly, a media file with a vector centered in the volume, may have a high score for the given style. And a vector close to the boundary of the volume may have a lower score for the given style.

Neural network tool 246 uses classification tool 240 and style identification tool 242, in search engine 232 and ranking tool 244 in recommendation engine 234 to provide accurate and likable search results from a user query. In some embodiments, neural network tool 246 may include a self-supervised or unsupervised network, where there are no style labels or media file captions to direct the algorithm to select a given style preference. In some embodiments, neural network tool 246 may be part of one or more machine learning models stored in a training database 252. Training database 252 includes training archives and other data files that may be used by search engine 232 in the training of a machine learning model, according to the input of the user through application 222. Moreover, in some embodiments, at least one or more training archives or machine learning models may be stored in either one of memories 220, and the user may have access to them through application 222. Neural network tool 246 may include algorithms trained for the specific purposes of the engines and tools included therein. The algorithms may include machine learning or artificial intelligence algorithms making use of any linear or non-linear algorithm, such as a neural network algorithm, or multivariate regression algorithm. In some embodiments, the machine learning model may include a neural network (NN), a convolutional neural network (CNN), a generative adversarial neural network (GAN), a deep reinforcement learning (DRL) algorithm, a deep recurrent neural network (DRNN), a classic machine learning algorithm such as random forest, k-nearest neighbor (KNN) algorithm, k-means clustering algorithms, or any combination thereof. More generally, the machine learning model may include any machine learning model involving a training step and an optimization step. In some embodiments, training database 252 may include a training archive to modify coefficients according to a desired outcome of the machine learning model. Accordingly, in some embodiments, search engine 232 is configured to access training database 252 to retrieve documents and archives as inputs for the machine learning model. In some embodiments, search engine 232, the tools contained therein, and at least part of training database 252 may be hosted in a different server that is accessible by server 130 or client device 110.

Figure 3:
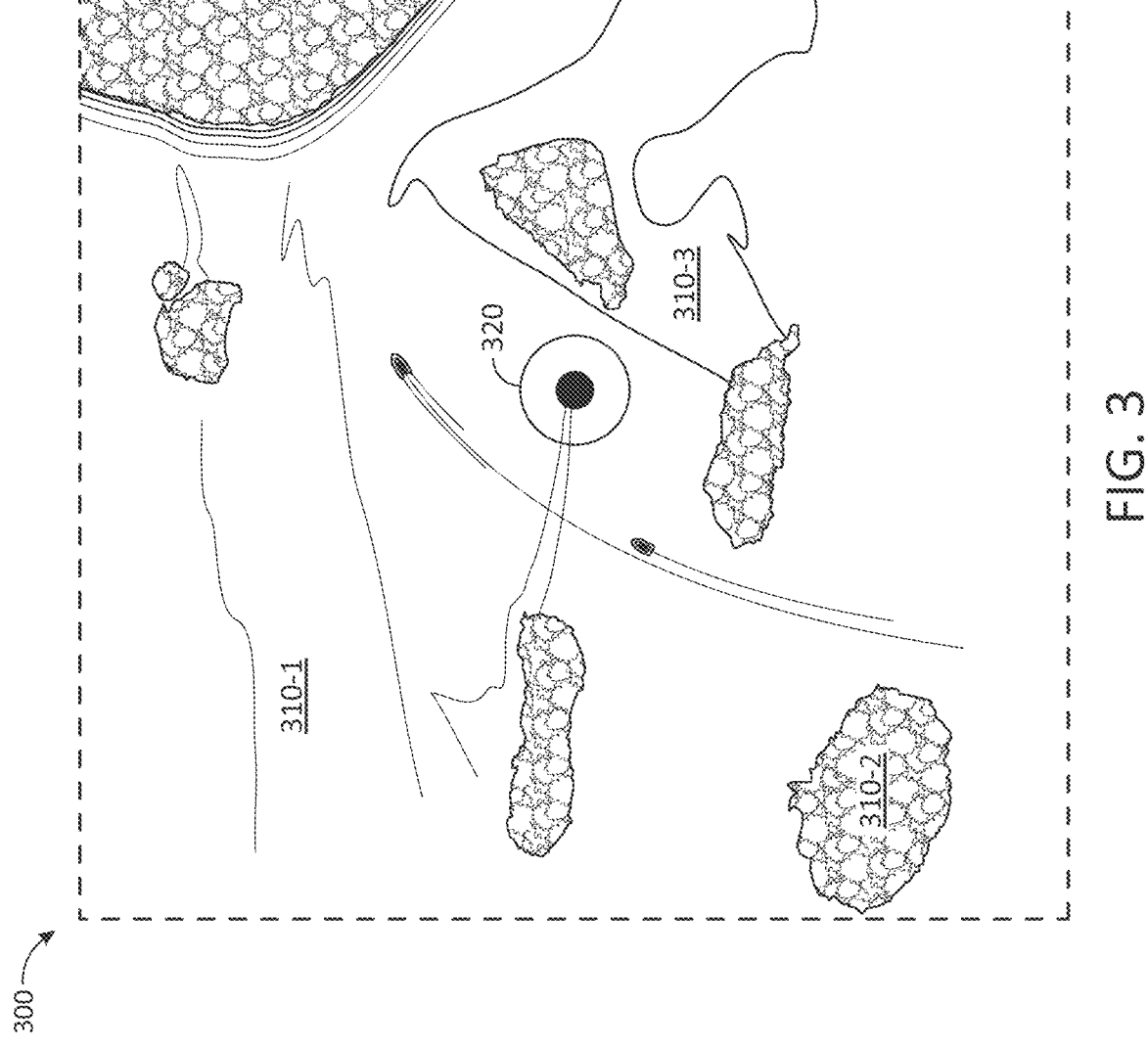
FIG. 3 illustrates an image having color attributes and angle of view attributes defining a style preference, according to some embodiments.
Figure 4B:
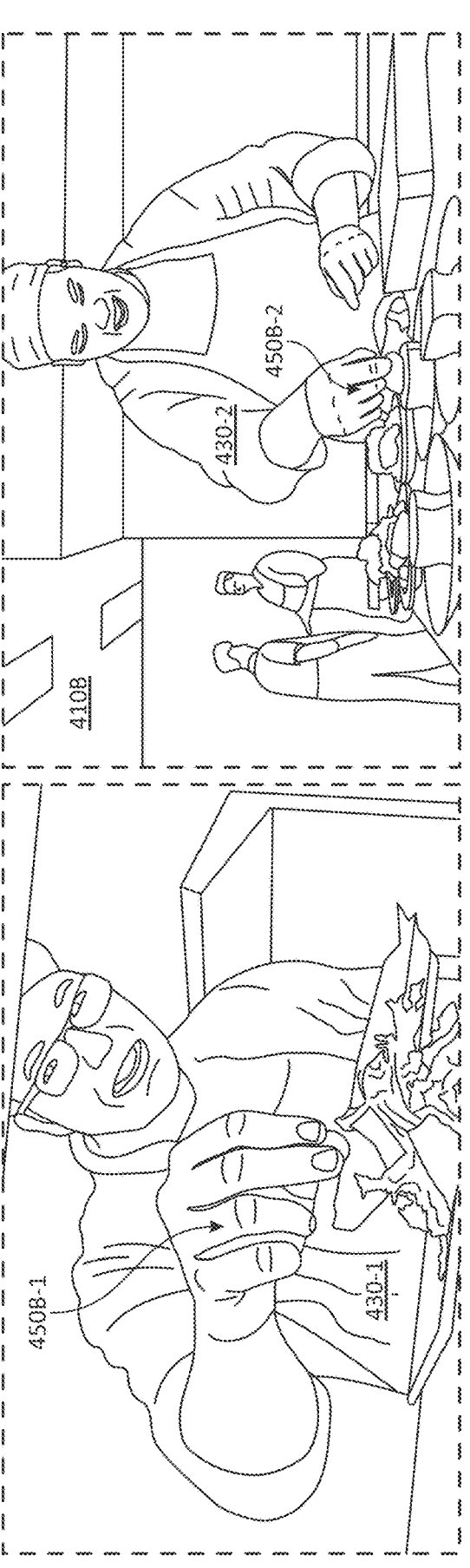
Figure 4C:
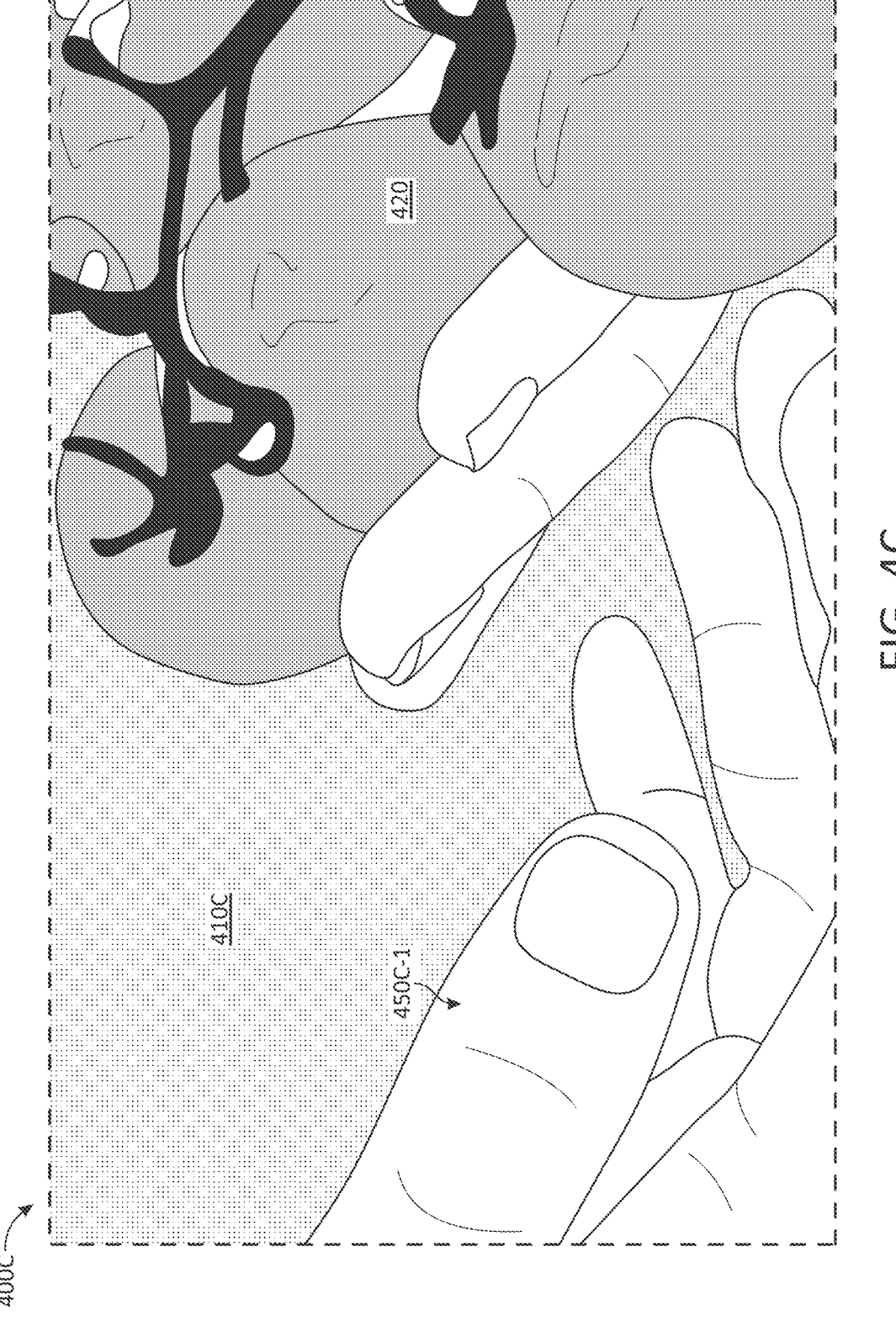
Figure 4D:
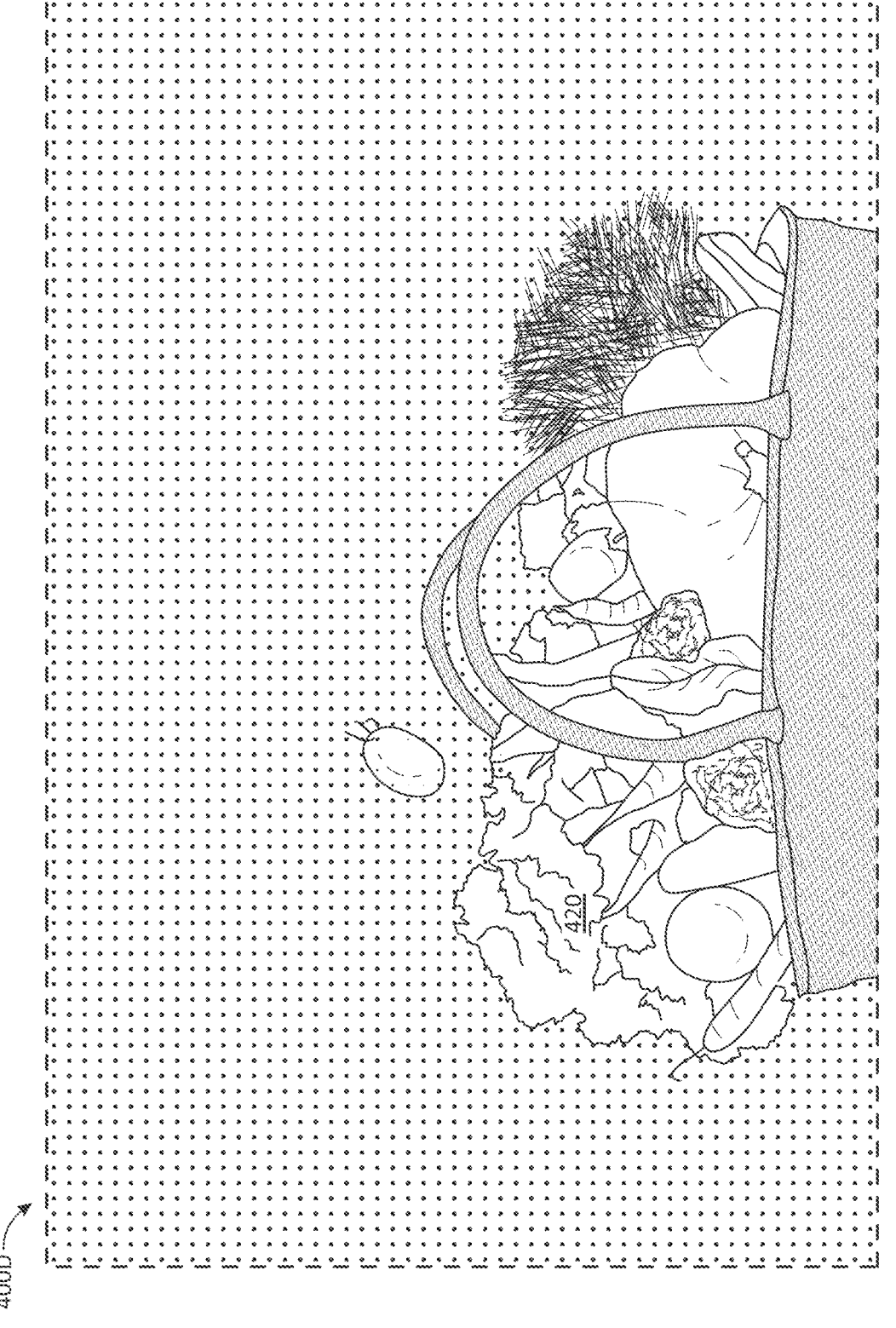
Figure 4E:
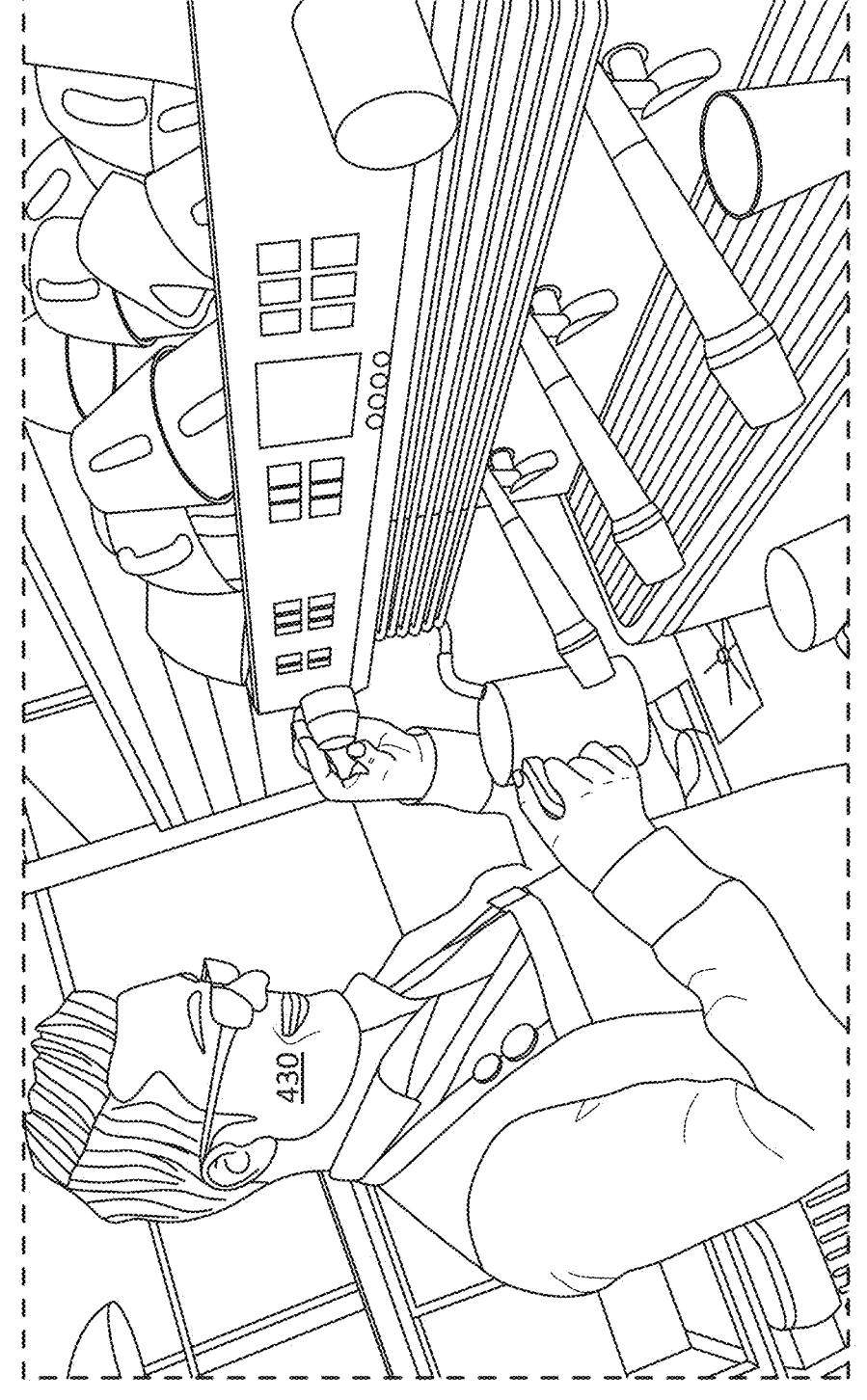
Figure 4F:
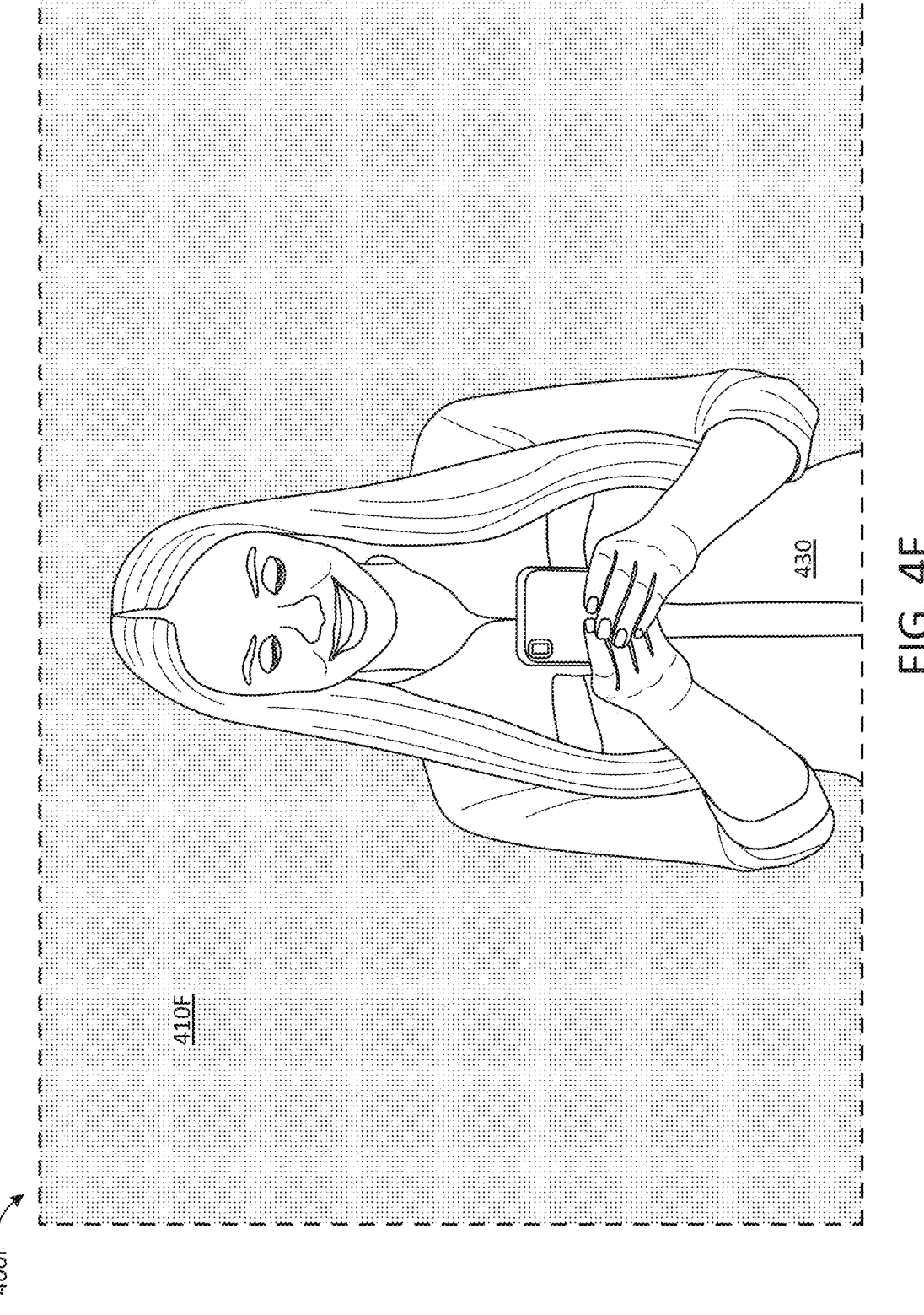
Figure 4G:
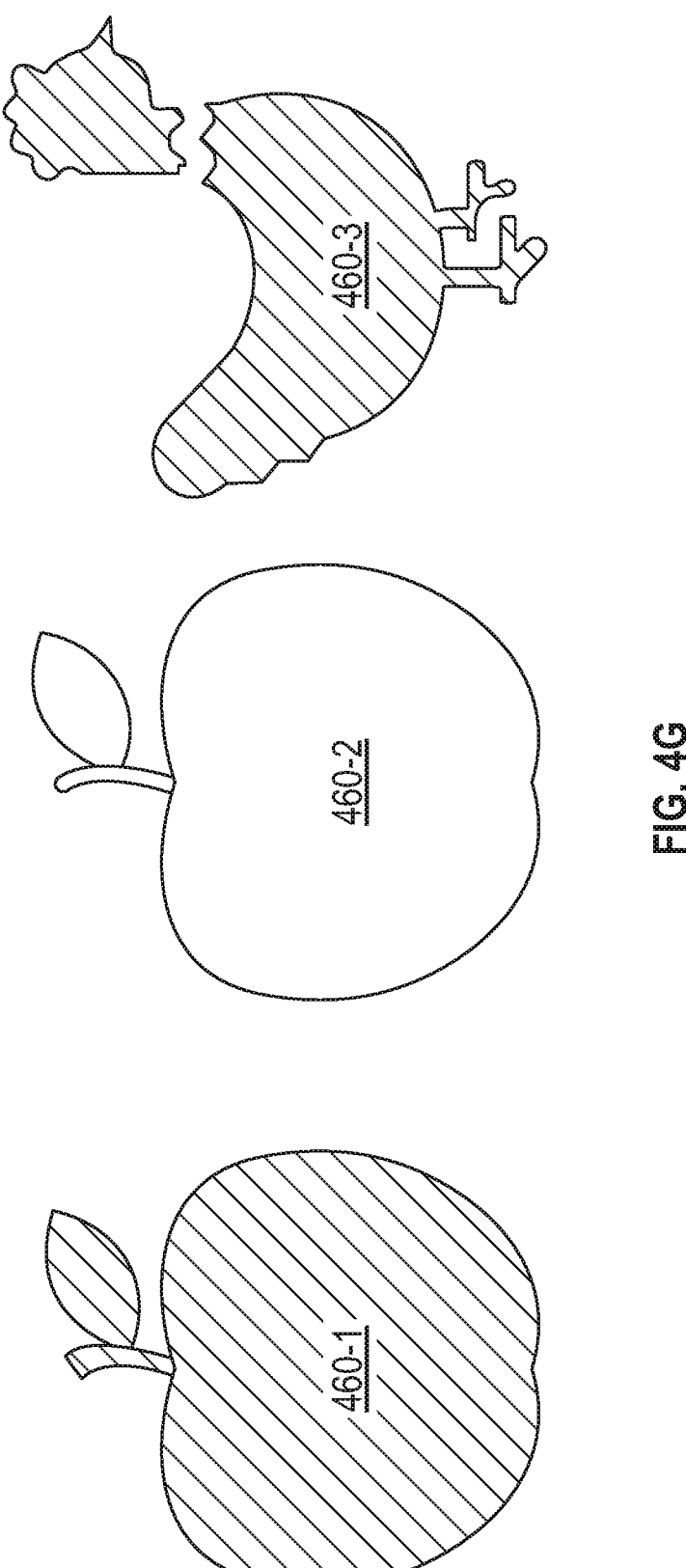

FIG. 3 illustrates an image 300 having color attributes 310-1 (light blue), 310-2 (bright green), 310-3 (clear white, hereinafter, collectively referred to as "color attributes 310"), and angle of view 320 (top-down, 90° incidence) attributes defining a style preference, according to some embodiments. To learn visual styles, a neural network algorithm as disclosed herein may be trained with different image features. In some embodiments, it is desirable to identify stable features that define a user style over a long period of time and multiple different projects, rather than low-level project-dependent features that tend to be variable within a single user over time and across different projects. Accordingly, for training a neural network model it is desirable to identify a personal style of a user or group of users (e.g., in an industry, country, or demographic group) that is maintained across multiple projects and media files downloaded or uploaded by the user.

FIGS. 4A-4G illustrate images 400A, 400B, 400C, 400D, 400E, 400F, and 400G (hereinafter, collectively referred to as "images 400") having attributes defining a style preference in a specific industry, according to some embodiments.

Images 400A-400E may be licensed by a user belonging to a company in the food industry, and thus the focus of the images is food 420, and people 430. We can observe some styles preferences in its licensing: Image 400A illustrates preference for homogenous and dark background 410A. Image 400B illustrates preference for close-up images of people subjects 430-1, 430-2 (hereinafter, collectively referred to as "people 430") in a bright background 410B. Images 400B and 400C show closeups of hands 450B-1, 450B-2, and 450C-1 (hereinafter, collectively referred to as "hand attributes 450"). Image 400C includes a blurry background 410C (shallow focal depth attribute), while image 400D has a sharp, flat contrasting background 410D.

Image 400F illustrates preference for stocky instead of more casual images of a person 430 against a sharp, flat background 410F.

Image 400G may be part of an advertisement or logo design bureau, where iconic silhouettes 460-1 (filled), 460-2 (outlined), and 460-3 (2-piece icon, hereinafter, collectively referred to as "icons 460") may represent a well-known brand.

Figure 5:
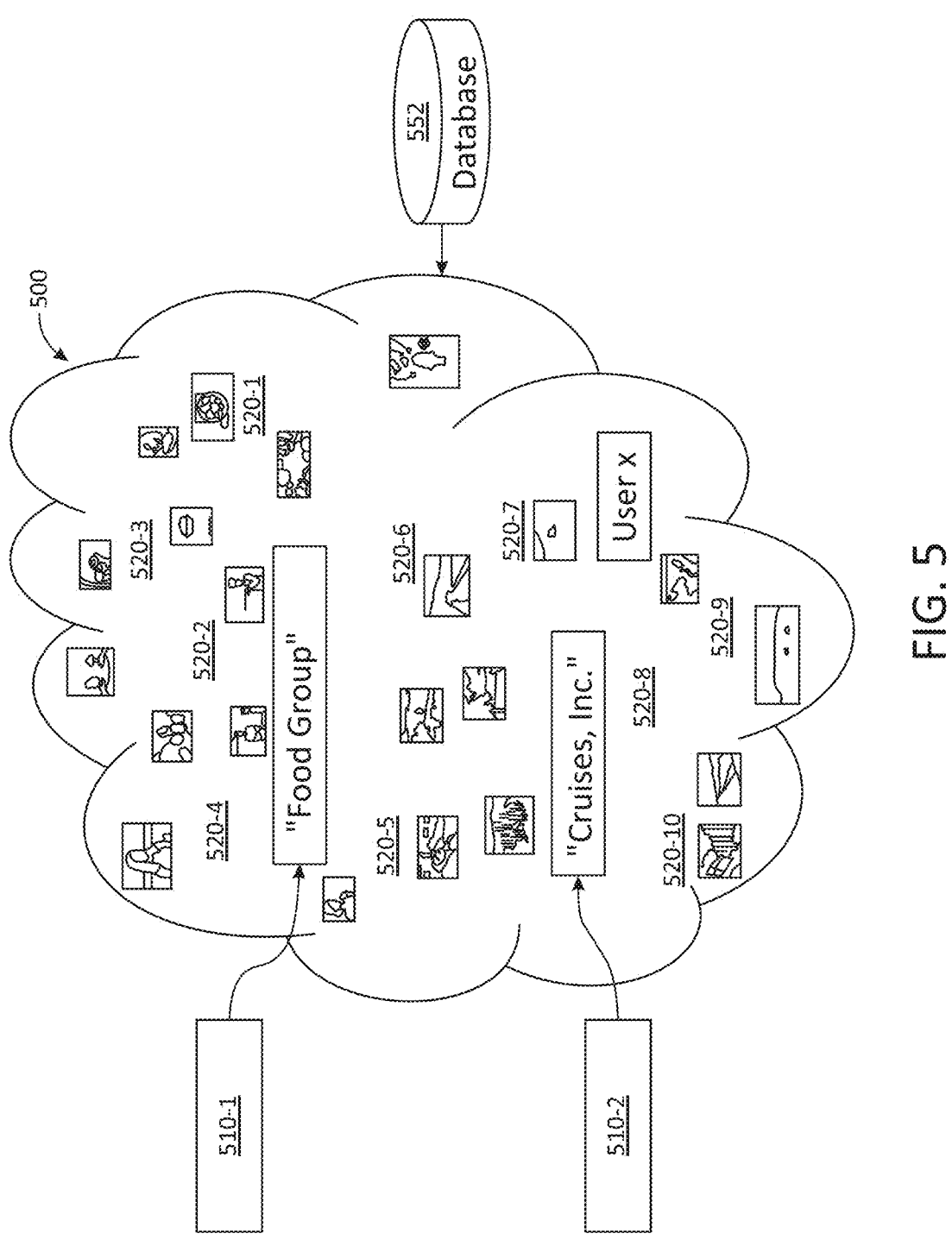
FIG. 5 illustrates an image space including multiple images downloaded or selected by two different users having different style preferences, according to some embodiments.

FIG. 5 illustrates an image space 500 including multiple images 520-1, 520-2, 520-3, 520-4, 520-5, 520-6, 520-7, 520-8, 520-9, and 520-10 (hereinafter, collectively referred to as "images 520") downloaded or selected by two different users 510-1 (food industry, "Food Group") and 510-2 (tourism and travel industry, "Cruises, Inc." hereinafter, collectively referred to as "users 510") having different style preferences, according to some embodiments. Each user has an ID, a country or region of origin (Spain, the UK, and the like), language (Spanish, English, and the like), and may include other data such as subscription type (monthly, etc.).

For each user 510, the system has their clicking history stored in database 552, and a set of features that identify users 510 (e.g., user identifier, country of origin, and the like). User 510-1 may include images 520-1 through 520-5 having orange-red colors with food subjects or people preparing food subjects. User 510-2 may be associated with images 520-6 through 520-10, which is more interested in wide-angle, travel images with bluish-green or clear colors.

Based on the attributes of images 520 that a user 510 has been clicking in the recent past, or in a more remote past, a search engine and a recommendation engine as disclosed herein learns to represent users and images in image space 500 (cf. search engine 232, recommendation engine 234, classification tool 240, and style identification tool 242). Accordingly, images 520-1 through 520-5 are closer together in image space 500, and so are images 520-6 through 520-10.

Accordingly, a ranking tool (cf. ranking tool 244), can compute affinity scores between visual styles of any user based on a relative distance in image space 500. The relative distance may be defined as a radial function or any other metric of the coordinates in image space 500, such as cosine directors, and the like.

Database 552 stores images 520 together with attributes identifying style preferences such as categories (food, environment, nature, people, and the like), country, colors, angle of view, style, and depth of focus (e.g., a geometric distribution of images 520 across image space 500 defined by the metric measure).

Figure 6A:
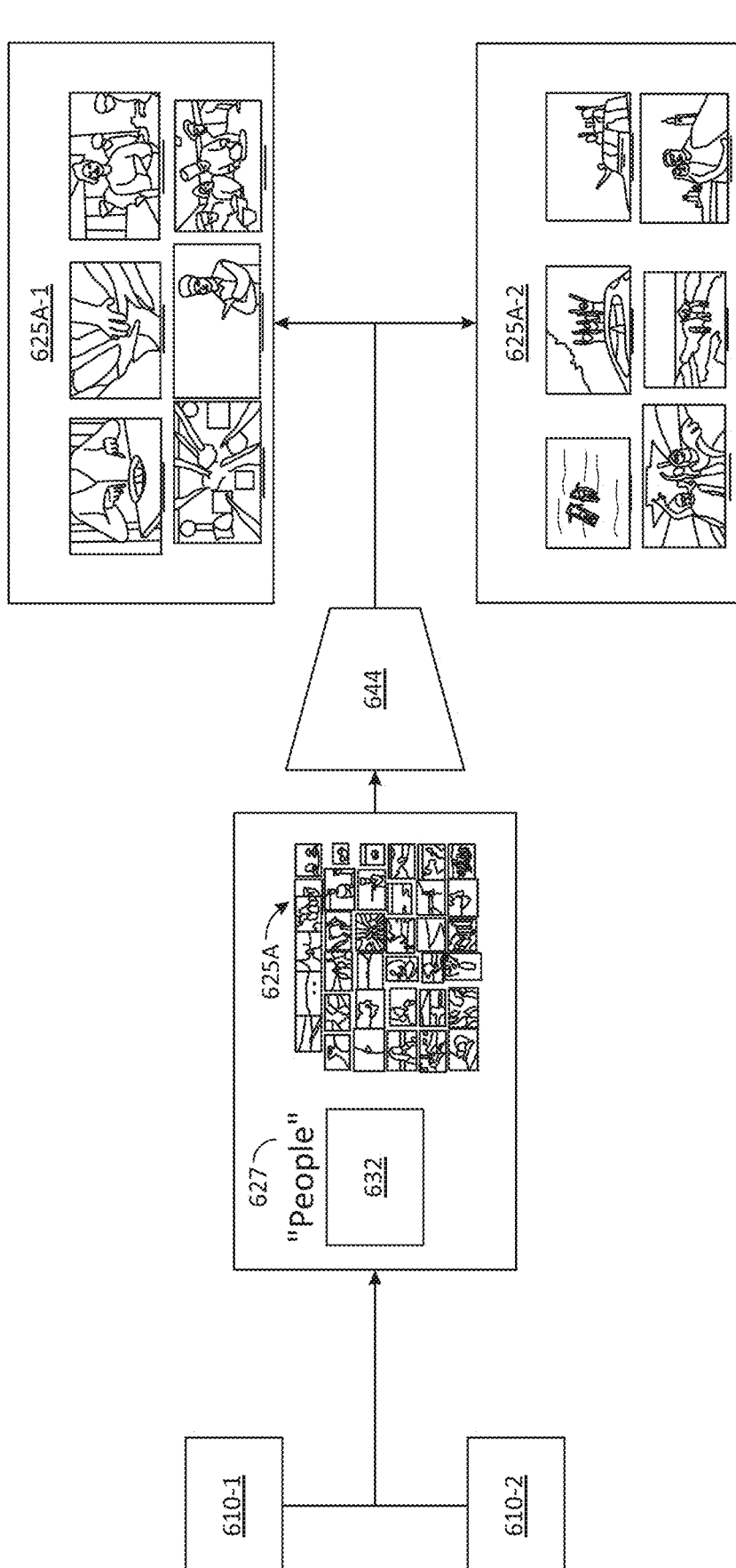
FIGS. 6A-6C illustrate a search engine and a ranking tool to provide search results based on a style preference of a user, according to some embodiments.
Figure 6B:
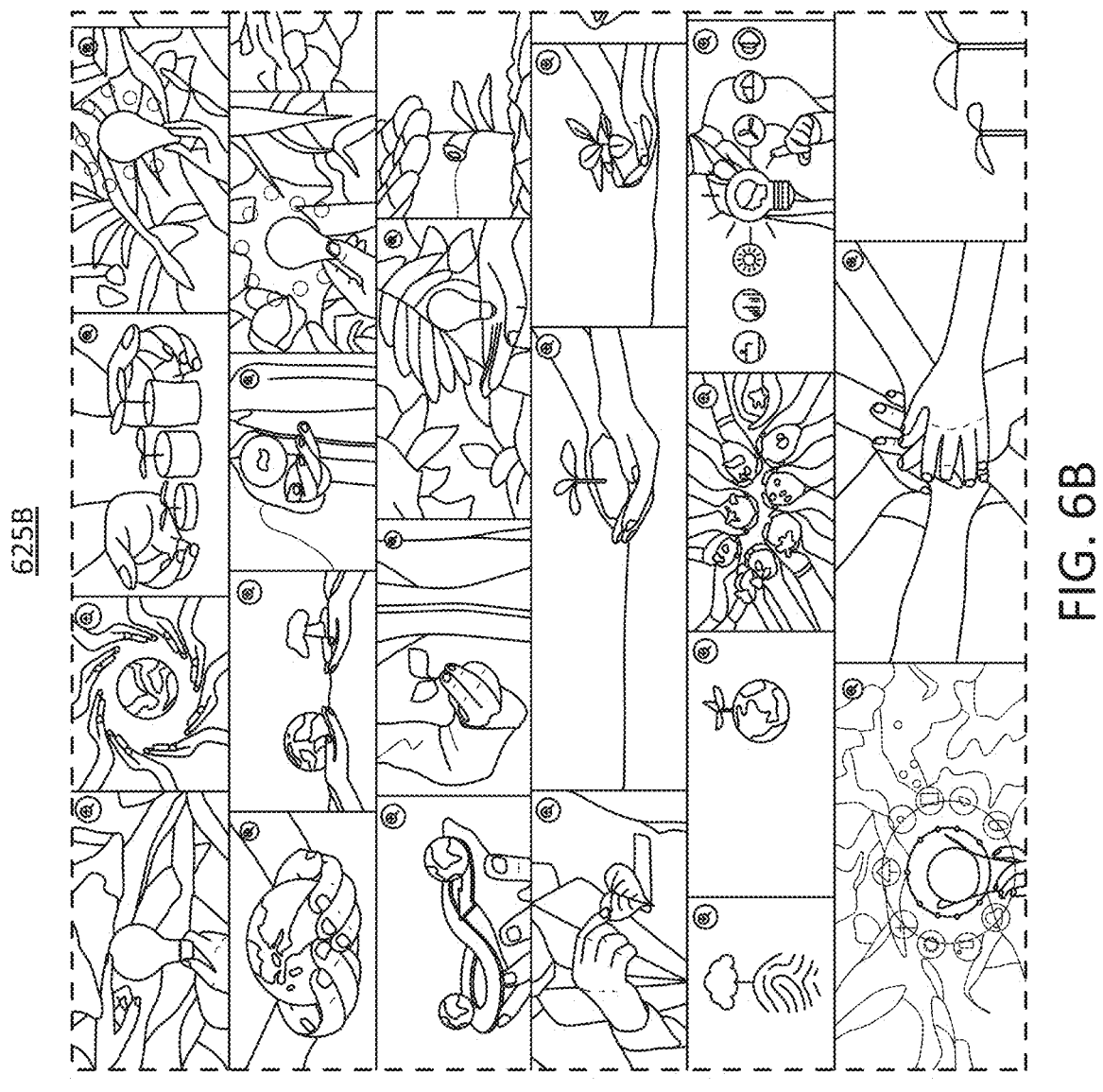
Figure 6C:
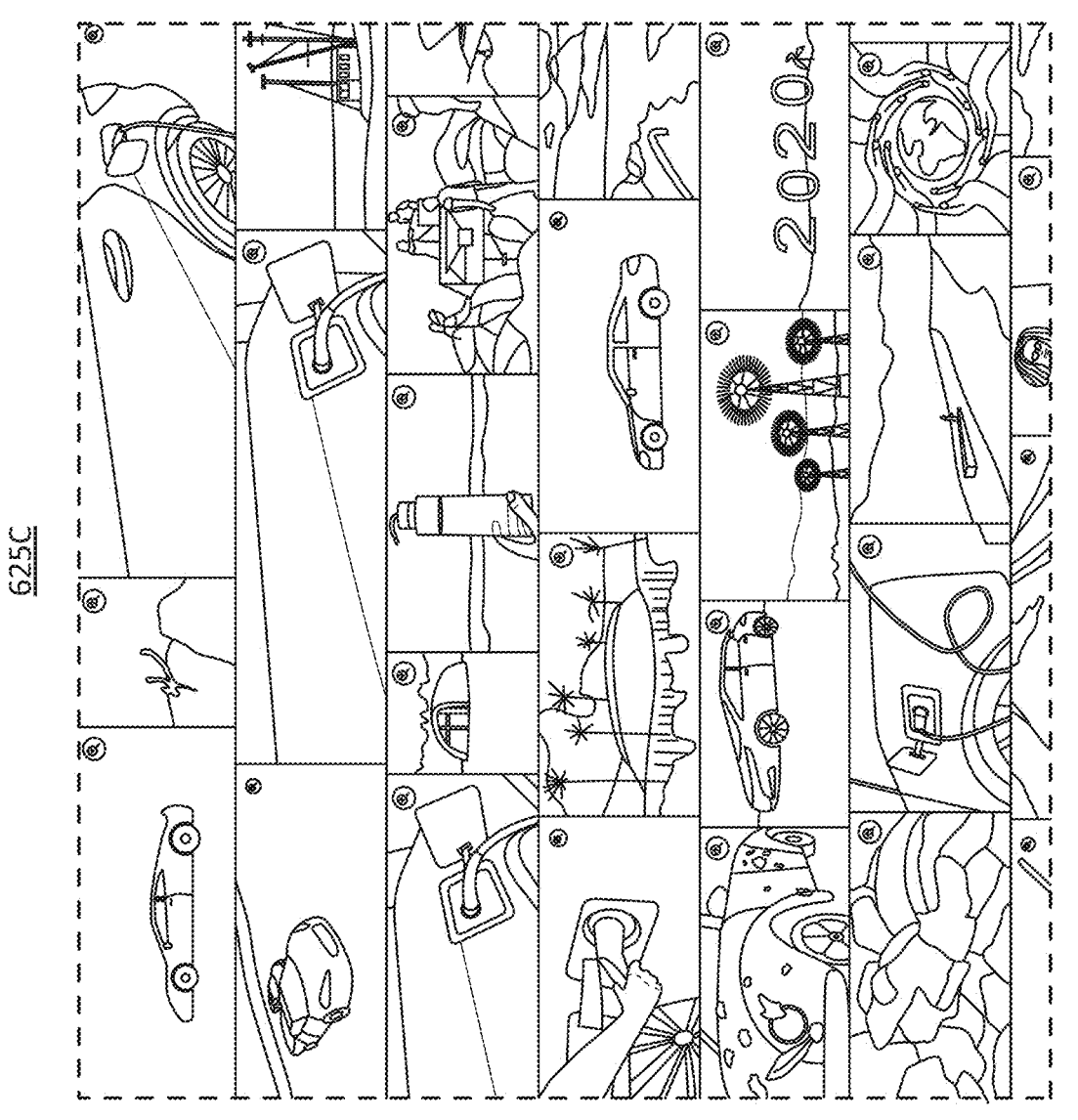

FIGS. 6A-6C illustrate a search engine 632 and a ranking tool 644 to provide search results 625A, 625A-1 and 625A-

2, 625B, and 625C (hereinafter, collectively referred to as "search results 625") based on a style preference of a user 610-1 (food industry) or 610-2 (travel industry, hereinafter, collectively referred to as "users 610"), according to some embodiments.

Users 610 provide a query 627 (e.g., "people") into search engine 632. A first output without a personalized style ranking tool produces a generic mix of options 625A. Search results 625A may not be the best option for either one of users 610. The reason for this is that typically the space in a display for a client device used by users 610 has a limited space and adding images that may not be relevant to either of users 610 is counterproductive. Accordingly, a ranking tool 644 as disclosed herein may further refine the search results based on a user style and provide search results 625A-1 ("food" style) for user 610-1 and search results 625A-2 ("travel" style) for user 610-2. Other personalization styles that ranking tool 644 may include are: country of origin, language of the search query, and the like.

For instance, for "people" query 627, search results 625A-1 may include stocky close-up images with a homogeneous background related to the food industry, while search results 625A-2 may include wide-angle, more casual images related to the travel industry.

When query 627 is the word "sustainability," search engine 632 and ranking tool 644 provide search results 625B for user 610-1, and search results 625C for user 610-2. Search results 625B includes close-up images with dark backgrounds, hands, greenish colors, and related to nature and plants. By contrast, search results 625C include wide-angle images with bluish colors, more related to technology and to the travel industry.

FIG. 7 is a flow chart illustrating steps in a method 700 for accessing a crowdsourcing creative agency to collaborate on a creative project, according to some embodiments. At least one or more of the steps in method 700 may be performed by a computer system in a client device or a server, the client device and the server being communicatively coupled through a network via a communications module (e.g., client device 110, server 130, network 150, and communications modules 218). The computer system may include a memory storing instructions which, when executed by a processor, perform at least partially one or more of the steps in method 700 (e.g., processors 212 and memories 220). In some embodiments, one or more steps in method 700 is at least partially executed by an application installed in the client device and hosted by a search engine and a recommendation engine in the server (e.g., application 222, search engine 232, and recommendation engine 234). Further, in some embodiments, one or more of the steps in method 700 may be performed by a classification tool, a style identification tool, a ranking tool, and a neural network tool, in the search and recommendations engines (e.g., classification tool 240, style identification tool 242, ranking tool 244, and neural network tool 246). Further, in some embodiments, data and information used in, or generated by, at least one of the steps in method 700 (e.g., a user-related search history) may be stored in a database communicatively coupled to, and hosted by, the server (e.g., database 252). Methods consistent with the present disclosure may include at least one or more of the steps in method 700 performed in a different order. For example, in some embodiments, steps in method 700 may be performed simultaneously, quasi-simultaneously, or overlapping in time.

Step 702 includes receiving, in a search engine, a search query for a media file from a user.

Step 704 includes identifying a style preference of the user associated with a one or more media file attributes, based on a user-related search history. In some embodiments, step 704 includes selecting the style preference from a cutoff portion of the user-related search history that is older than a pre-selected time. In some embodiments, step 704 includes identifying image attributes from a metadata, a color selection, an angle of view, a texture, a visual pattern, a contrast, and a combination thereof. In some embodiments, step 704 includes comparing the one or more media file attributes with salient attributes from media files in the user-related search history. In some embodiments, step 704 includes selecting a media file that has been clicked on by the user according to the user-related search history. In some embodiments, step 704 includes identifying a geographic origin of the user from a metadata attribute of the media file. In some embodiments, step 704 includes identifying a professional association of the user.

Step 706 includes selecting, from a database, a one or more media files based on the search query and the style preference of the user.

Step 708 includes determining a style preference score for the one or more media files, based on the media file attributes.

Step 710 includes recommending to the user a top ranked media file based on the style preference score. In some embodiments, step 710 includes verifying that the user-related search history includes one or more media files associated with a semantically different search query. In some embodiments, step 710 includes receiving, in the search engine from a content producer, a new media file, identifying a salient attribute in the new media file, updating a style preference for the content producer based on the salient attribute, and storing the new media file with the style preference for the content producer in a database. In some embodiments, step 710 includes defining a new style preference for the user based on the search query, and storing the new style preference in a database.

FIG. 8 is a flow chart illustrating steps in a method 800 for accessing a crowdsourcing creative agency to collaborate on a creative project, according to some embodiments. At least one or more of the steps in method 800 may be performed by a computer system in a client device or a server, the client device and the server being communicatively coupled through a network via a communications module (e.g., client device 110, server 130, network 150, and communications modules 218). The computer system may include a memory storing instructions which, when executed by a processor, perform at least partially one or more of the steps in method 800 (e.g., processors 212 and memories 220). In some embodiments, one or more steps in method 800 is at least partially executed by an application installed in the client device and hosted by a search engine and a recommendation engine in the server (e.g., application 222, search engine 232, and recommendation engine 234). Further, in some embodiments, one or more of the steps in method 800 may be performed by a classification tool, a style identification tool, a ranking tool, and a neural network tool, in the search and recommendations engines (e.g., classification tool 240, style identification tool 242, ranking tool 244, and neural network tool 246). Further, in some embodiments, data and information used in, or generated by, at least one of the steps in method 800 (e.g., a user-related search history) may be stored in a database communicatively coupled to, and hosted by, the server (e.g., database 252). Methods consistent with the present disclosure may include at least one or more of the steps in method 800 performed in a different order. For example, in some embodiments, steps in method 800 may be performed simultaneously, quasi-simultaneously, or overlapping in time.

Step 802 includes retrieving a new media file selected by the user. In some embodiments, step 802 includes verifying that a search query associated with the new media file is different from one or more search queries in the user-related search history. In some embodiments, step 802 includes retrieving a new media file selected by the user after a pre-determined period of time has passed relative to a most recent media file in the user-related search history.

Step 804 includes determining a style preference score for the new media file based on the model.

When the style preference score is lower than a pre-selected value, step 806 includes identifying a new attribute in the new media file that is not included in the model, updating a first coefficient in the model based on a value of the new attribute, scoring multiple media files in a user-related search history with the model to form a ranked list, and updating a second coefficient in the model when the new media file is not at a top of the ranked list, relative to the media files in the user-related search history. In some embodiments, step 806 includes identifying a salient feature in the new media file.

Step 808 includes retrieving, from a user search history, an unselected media file.

Step 810 includes determining a style preference score for the unselected media file, based on the model.

Step 812 includes updating at least a third coefficient in the model to decrease the style preference score for the unselected media file.

Hardware Overview

Figure 9:
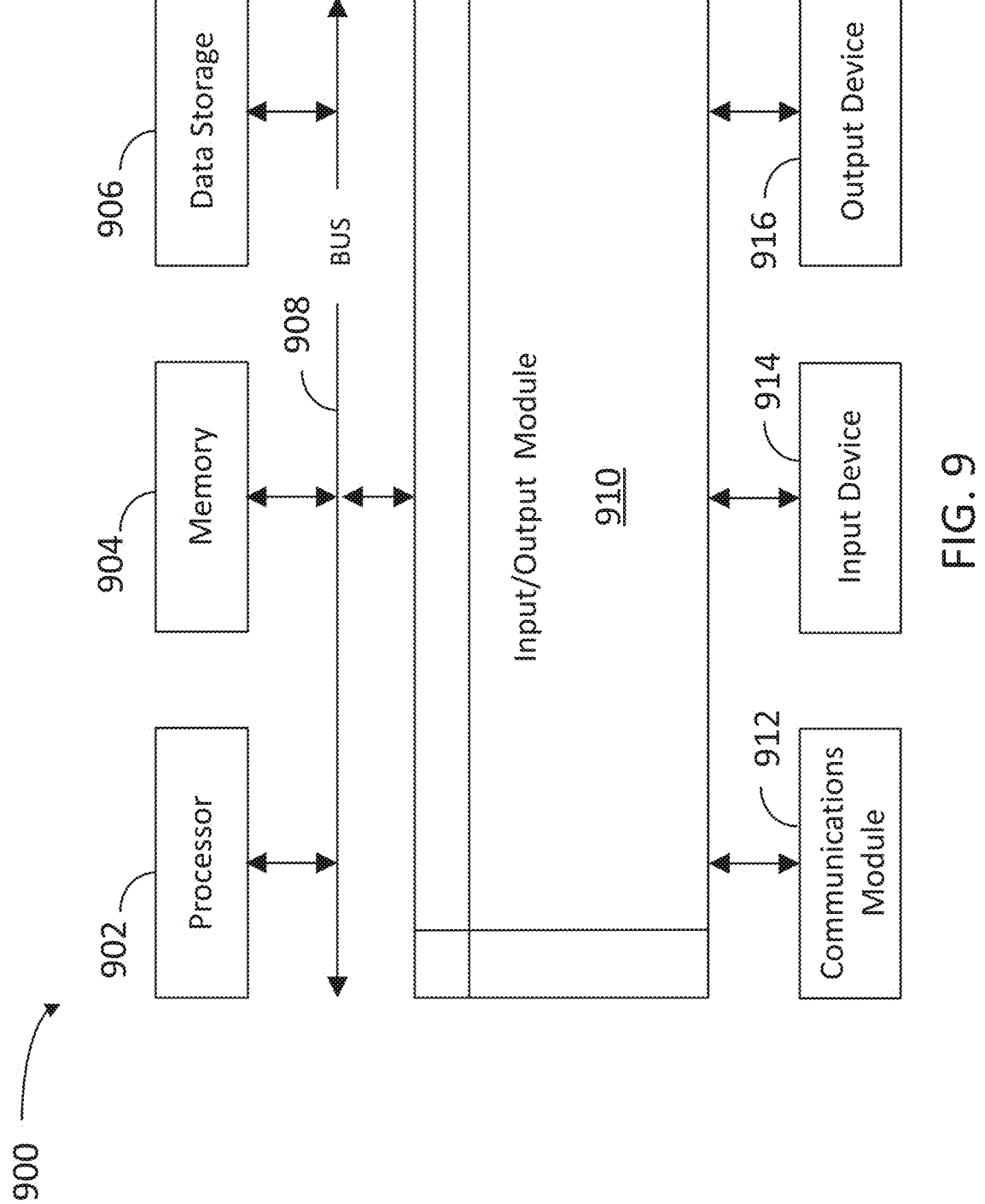
FIG. 9 is a block diagram illustrating an example computer system with which the client and server of FIGS. 1 and 2 and the methods of FIGS. 7-8 can be implemented.

FIG. 9 is a block diagram illustrating an exemplary computer system 900 with which the client and server of FIGS. 1 and 2, and the methods of FIGS. 7 and 8 can be implemented. In certain aspects, the computer system 900 may be implemented using hardware or a combination of software and hardware, either in a dedicated server, or integrated into another entity, or distributed across multiple entities.

Computer system 900 (e.g., client 110 and server 130) includes a bus 908 or other communication mechanism for communicating information, and a processor 902 (e.g., processors 212) coupled with bus 908 for processing information. By way of example, the computer system 900 may be implemented with one or more processors 902. Processor 902 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 900 can include, in addition to hardware, code that creates an execution environment for the computer program in question, e.g., code that constitutes processor firmware, a protocol stack, a database management system, an operating system, or a combination of one or more of them stored in an included memory 904 (e.g., memories 220), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 908 for storing information and instructions to be executed by processor 902. The processor 902 and the memory 904 can be supplemented by, or incorporated in, special purpose logic circuitry.

The instructions may be stored in the memory 904 and implemented in one or more computer program products, e.g., one or more modules of computer program instructions encoded on a computer-readable medium for execution by, or to control the operation of, the computer system 900, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 904 may also be used for storing temporary variable or other intermediate information during execution of instructions to be executed by processor 902.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 900 further includes a data storage device 906 such as a magnetic disk or optical disk, coupled to bus 908 for storing information and instructions. Computer system 900 may be coupled via input/output module 910 to various devices. Input/output module 910 can be any input/output module. Exemplary input/output modules 910 include data ports such as USB ports. The input/output module 910 is configured to connect to a communications module 912. Exemplary communications modules 912 (e.g., communications modules 218) include networking interface cards, such as Ethernet cards and modems. In certain aspects, input/output module 910 is configured to connect to a plurality of devices, such as an input device 914 (e.g., input device 214) and/or an output device 916 (e.g., output device 216). Exemplary input devices 914 include a keyboard and a pointing device, e.g., a mouse or a trackball, by which a user can provide input to the computer system 900. Other kinds of input devices 914 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 916 include display devices, such as an LCD (liquid crystal display) monitor, for displaying information to the user.

According to one aspect of the present disclosure, the client 110 and server 130 can be implemented using a computer system 900 in response to processor 902 executing one or more sequences of one or more instructions contained in memory 904. Such instructions may be read into memory 904 from another machine-readable medium, such as data storage device 906. Execution of the sequences of instructions contained in main memory 904 causes processor 902 to perform the process steps described herein. One or more processors in a multi-processing arrangement may also be employed to execute the sequences of instructions contained in memory 904. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication tool (e.g., network 150) can include, for example, any one or more of a LAN, a WAN, the Internet, and the like. Further, the communication tool can include, but is not limited to, for example, any one or more of the following tool topologies, including a bus network, a star network, a ring network, a mesh network, a star-bus network, tree or hierarchical network, or the like. The communications modules can be, for example, modems or Ethernet cards.

Computer system 900 can include clients and servers. A client and server are generally remote from each other and typically interact through a communication network. The relationship of client and server arises by virtue of computer programs running on the respective computers and having a client-server relationship to each other. Computer system 900 can be, for example, and without limitation, a desktop computer, laptop computer, or tablet computer. Computer system 900 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 902 for execution. Such a medium may take many forms, including, but not limited to, non-volatile media, volatile media, and transmission media. Non-volatile media include, for example, optical or magnetic disks, such as data storage device 906. Volatile media include dynamic memory, such as memory 904. Transmission media include coaxial cables, copper wire, and fiber optics, including the wires forming bus 908. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method comprising:
   determining a style preference score for a new media file based on a recommendation model, wherein the new media file is selected by a user, wherein the recommendation model is a machine learning model using a neural network; and
   when the style preference score is lower than a pre-selected value:
      identifying a new attribute in the new media file that is not included in the recommendation model,
      updating, using a first machine learning model training step, a first coefficient in the recommendation model based on a value of the new attribute,
      scoring multiple media files in a user-related search history of the user with the recommendation model based on a distance for each of the multiple media files in a multi-dimensional space defined by classifiers to form a ranked list based on the updated first coefficient, and
      updating, using a second machine learning model training step, a second coefficient in the recommendation model when the new media file is not at a top position of the ranked list, relative to the multiple media files in the user-related search history; and
   storing the updated recommendation model in a training database.

2. The computer-implemented method of claim 1, further comprising verifying that a respective search query associated with the new media file is different from one or more search queries in the user-related search history.

3. The computer-implemented method of claim 1, further comprising retrieving the new media file selected by the user after a pre-determined period of time has passed relative to a most recent media file in the user-related search history.

4. The computer-implemented method of claim 1, further comprising, when the style preference score is higher than the pre-selected value, increasing a cutoff to selected older files in the user-related search history.

5. The computer-implemented method of claim 1, wherein the identifying of the new attribute in the new media file comprises identifying a salient feature in the new media file.

6. The computer-implemented method of claim 1, further comprising:
   retrieving, from the user-related search history, an unselected media file;
   determining a style preference score for the unselected media file,
   based on the recommendation model; and
   updating a third coefficient in the recommendation model to decrease the style preference score for the unselected media file.

7. The computer-implemented method of claim 1, further comprising:
   receiving a search query from the user; and
   recommending, to the user, a top-ranked media file matching the search query based on the updated recommendation model.

8. A non-transitory computer-readable medium storing a program, which when executed by a computer, configures the computer to:
   determine a style preference score for a new media file based on a recommendation model, wherein the new media file is selected by a user, wherein the recommendation model is a machine learning model using a neural network; and
   when the style preference score is lower than a pre-selected value:
      identify a new attribute in the new media file that is not included in the recommendation model,
      update, using a first machine learning model training step, a first coefficient in the recommendation model based on a value of the new attribute,
      score multiple media files in a user-related search history of the user with the recommendation model based on a distance for each of the multiple media files in a multi-dimensional space defined by classifiers to form a ranked list based on the updated first coefficient, and
      update, using a second machine learning model training step, a second coefficient in the recommendation model when the new media file is not at a top position of the ranked list, relative to the multiple media files in the user-related search history; and
   store the updated recommendation model in a training database.

9. The non-transitory computer-readable medium of claim 8, wherein the program, when executed by the computer, further configures the computer to verify that a respective search query associated with the new media file is different from one or more search queries in the user-related search history.

10. The non-transitory computer-readable medium of claim 8, wherein the program, when executed by the computer, further configures the computer to retrieve the new media file selected by the user after a pre-determined period of time has passed relative to a most recent media file in the user-related search history.

11. The non-transitory computer-readable medium of claim 8, wherein the program, when executed by the computer, further configures the computer to, when the style preference score is higher than the pre-selected value, increase a cutoff to selected older files in the user-related search history.

12. The non-transitory computer-readable medium of claim 8, wherein the identifying of the new attribute in the new media file comprises identifying a salient feature in the new media file.

13. The non-transitory computer-readable medium of claim 8, wherein the program, when executed by the computer, further configures the computer to:

retrieve, from the user-related search history, an unselected media file;

determine a style preference score for the unselected media file, based on the recommendation model; and update a third coefficient in the recommendation model to decrease the style preference score for the unselected media file.

14. The non-transitory computer-readable medium of claim 8, wherein the program, when executed by the computer, further configures the computer to:

receive a search query from the user; and recommend, to the user, a top-ranked media file matching the search query based on the updated recommendation model.

15. A system comprising:

a processor; and a non-transitory computer readable medium storing a set of instructions, which when executed by the processor, configure the system to:

determine a style preference score for a new media file based on a recommendation model, wherein the new media file is selected by a user, wherein the recommendation model is a machine learning model using a neural network; and when the style preference score is lower than a pre-selected value:

identify a new attribute in the new media file that is not included in the recommendation model, update, using a first machine learning model training step, a first coefficient in the recommendation model based on a value of the new attribute, score multiple media files in a user-related search history of the user with the recommendation model based on a distance for each of the multiple media files in a multi-dimensional space defined by classifiers to form a ranked list based on the updated first coefficient, and update, using a second machine learning model training step, a second coefficient in the recommendation model when the new media file is not at a top position of the ranked list, relative to the multiple media files in the user-related search history; and store the updated recommendation model in a training database.

16. The system of claim 15, wherein the set of instructions, which when executed by the processor, further configure the system to verify that a respective search query associated with the new media file is different from one or more search queries in the user-related search history.

17. The system of claim 15, wherein the set of instructions, which when executed by the processor, further configure the system to retrieve the new media file selected by the user after a pre-determined period of time has passed relative to a most recent media file in the user-related search history.

18. The system of claim 15, wherein the set of instructions, which when executed by the processor, further configure the system to, when the style preference score is higher than the pre-selected value, increase a cutoff to selected older files in the user-related search history.

19. The system of claim 15, wherein the identifying of the new attribute in the new media file comprises identifying a salient feature in the new media file.

20. The system of claim 15, wherein the set of instructions, which when executed by the processor, further configure the system to:

retrieve, from the user-related search history, an unselected media file;

determine a style preference score for the unselected media file, based on the recommendation model; and update a third coefficient in the recommendation model to decrease the style preference score for the unselected media file.

* * * * *